United States Patent
Salter et al.

(10) Patent No.: US 10,493,904 B2
(45) Date of Patent: Dec. 3, 2019

(54) VEHICLE LIGHT ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); Pietro Buttolo, Dearborn Heights, MI (US); Annette Lynn Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/651,443

(22) Filed: Jul. 17, 2017

(65) Prior Publication Data

US 2019/0016254 A1    Jan. 17, 2019

(51) Int. Cl.
| | |
|---|---|
| *H05B 33/00* | (2006.01) |
| *B60Q 1/26* | (2006.01) |
| *B60R 1/12* | (2006.01) |
| *B60Q 1/00* | (2006.01) |
| *F21V 5/00* | (2018.01) |
| *F21V 7/00* | (2006.01) |
| *F21V 7/06* | (2006.01) |
| *F21V 9/30* | (2018.01) |

(52) U.S. Cl.
CPC ......... *B60Q 1/2665* (2013.01); *B60Q 1/0023* (2013.01); *B60R 1/1207* (2013.01); *F21V 5/007* (2013.01); *F21V 7/0083* (2013.01); *F21V 7/06* (2013.01); *F21V 9/30* (2018.02); *B60Q 2400/40* (2013.01); *B60Q 2900/30* (2013.01)

(58) Field of Classification Search
CPC .. H04N 5/23296; H04N 5/247; H04N 5/2251; H04N 5/33; H04N 5/23216; H04N 5/23293; H04N 7/22; H04N 9/3105; H04N 9/315; H04N 13/0022; H04N 13/0242; H04N 2013/0077; H04N 5/23212; H04N 5/23219
See application file for complete search history.

(56) References Cited

U.S. PATENT DOCUMENTS

| | | | |
|---|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 5,997,163 A | 12/1999 | Brown |
| 6,031,511 A | 2/2000 | DeLuca et al. |
| 6,117,362 A | 9/2000 | Yen et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Monica C King
(74) *Attorney, Agent, or Firm* — Vichit Chea; Price Heneveld LLP

(57) ABSTRACT

A vehicle includes a mirror light assembly. A plurality of light sources is disposed in a housing and a plurality of reflectors surrounds each light source having a focal axis that is offset from each of the remaining reflectors. A sensor is configured to detect an object proximate the vehicle. A controller is configured to selectively illuminate the light sources to illuminate the object.

9 Claims, 12 Drawing Sheets

(56) References Cited

U.S. PATENT DOCUMENTS

| | | |
|---|---|---|
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,344,284 B2 | 3/2008 | Lynam et al. |
| 7,347,576 B2 | 3/2008 | Wang et al. |
| 7,427,150 B2 | 9/2008 | Carter et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,986,078 B2 | 7/2011 | Horiguchi et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,274,226 B1 | 9/2012 | Sikora et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Kuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0039082 A1* | 2/2012 | Rodriguez Barros ............... B60Q 1/2665 362/494 |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0242586 A1 | 9/2013 | Huizen et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0218212 A1* | 8/2014 | Nykerk ............... B60Q 1/0023 340/901 |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0043712 A1* | 2/2017 | Paszkowicz ............ B60K 37/00 |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |

(56) References Cited

FOREIGN PATENT DOCUMENTS

| DE | 29708699 U1 | 7/1997 |
|---|---|---|
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| KR | 20090011500 A | 2/2009 |
| KR | 20090011500 A1 | 9/2009 |
| WO | 2006047306 A1 | 5/2006 |
| WO | 2014068440 A1 | 5/2014 |
| WO | 2014161927 A1 | 10/2014 |

\* cited by examiner

VEHICLE LIGHT ASSEMBLY

FIELD OF THE INVENTION

The present disclosure generally relates to vehicles, and more particularly, to vehicle light assemblies.

BACKGROUND OF THE INVENTION

Automotive vehicles are commonly equipped with various exterior lighting assemblies. As such, adding additional functionality to such lighting assemblies may be advantageous.

SUMMARY OF THE INVENTION

According to at least one feature of the present disclosure, a vehicle includes a mirror light assembly. A plurality of light sources is disposed in a housing and a plurality of reflectors surrounds each light source having a focal axis that is offset from each of the remaining reflectors. A sensor is configured to detect an object proximate the vehicle. A controller is configured to selectively illuminate the light sources to illuminate the object.

According to another feature of the present disclosure, a method of operating a vehicle, includes the steps: detecting a location of an object proximate the vehicle via one or more wireless communication transceivers, emitting a spotlight from a side-view mirror to illuminate the object, detecting a change in orientation between the vehicle and the object; and adjusting the spotlight to illuminate the object.

According to yet another feature of the present disclosure, a method of operating a vehicle, includes the steps: detecting a second vehicle proximate the vehicle via a sensor, illuminating a light assembly positioned on a side-view mirror of the vehicle; and emitting a spotlight from the side-view mirror to illuminate the second vehicle.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1A:
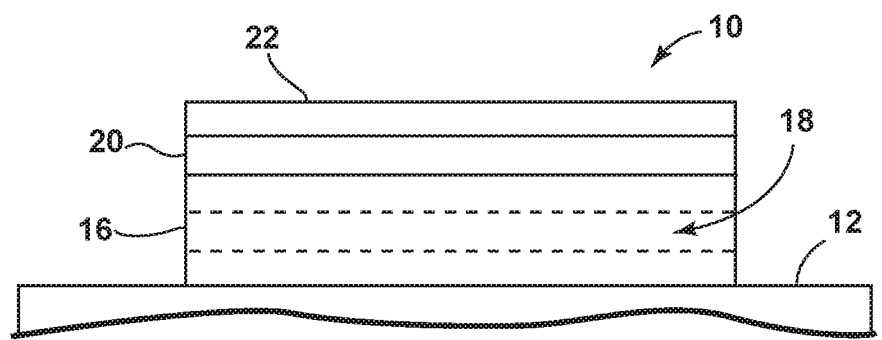
FIG. 1A is a side view of a photoluminescent structure rendered as a coating for use in an assembly according to one embodiment.
Figure 1B:
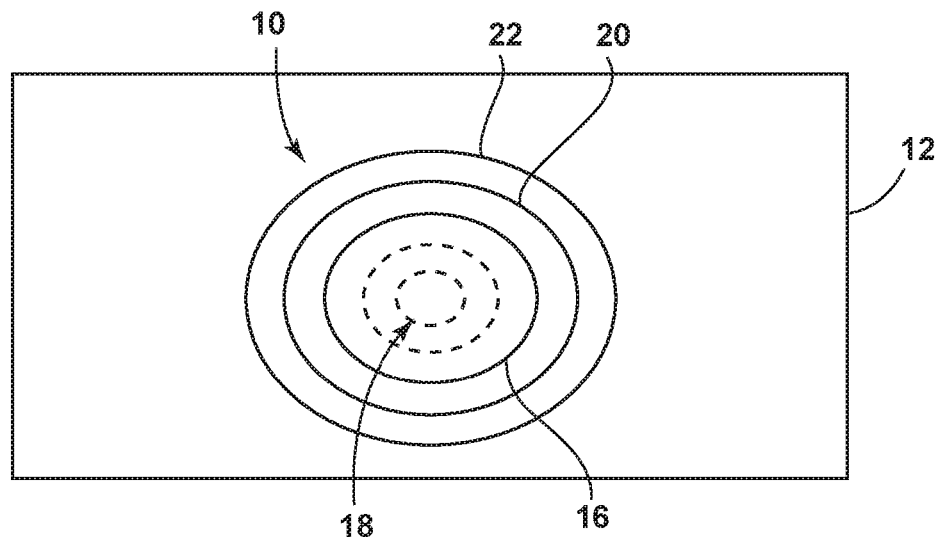
FIG. 1B is a top view of a photoluminescent structure rendered as a discrete particle according to one embodiment.
Figure 1C:
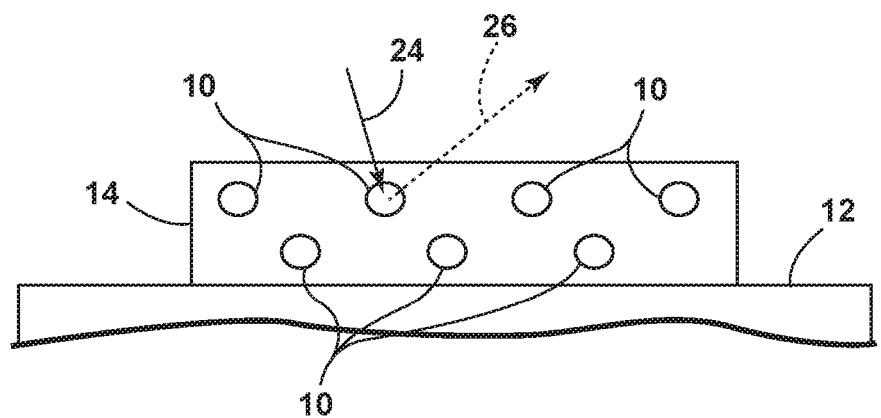
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle-related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with the substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to the substrate 12 by painting, screen-printing, spraying, slot coating, dip coating, roller coating and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into the substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create a red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Agrawal et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 $mcd/m^2$ after a period of 10 minutes. Additionally, the long persistence photoluminescent material 18 may be operable to emit light above or at an intensity of 0.32 $mcd/m^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emit the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 $mcd/m^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue-emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2A:
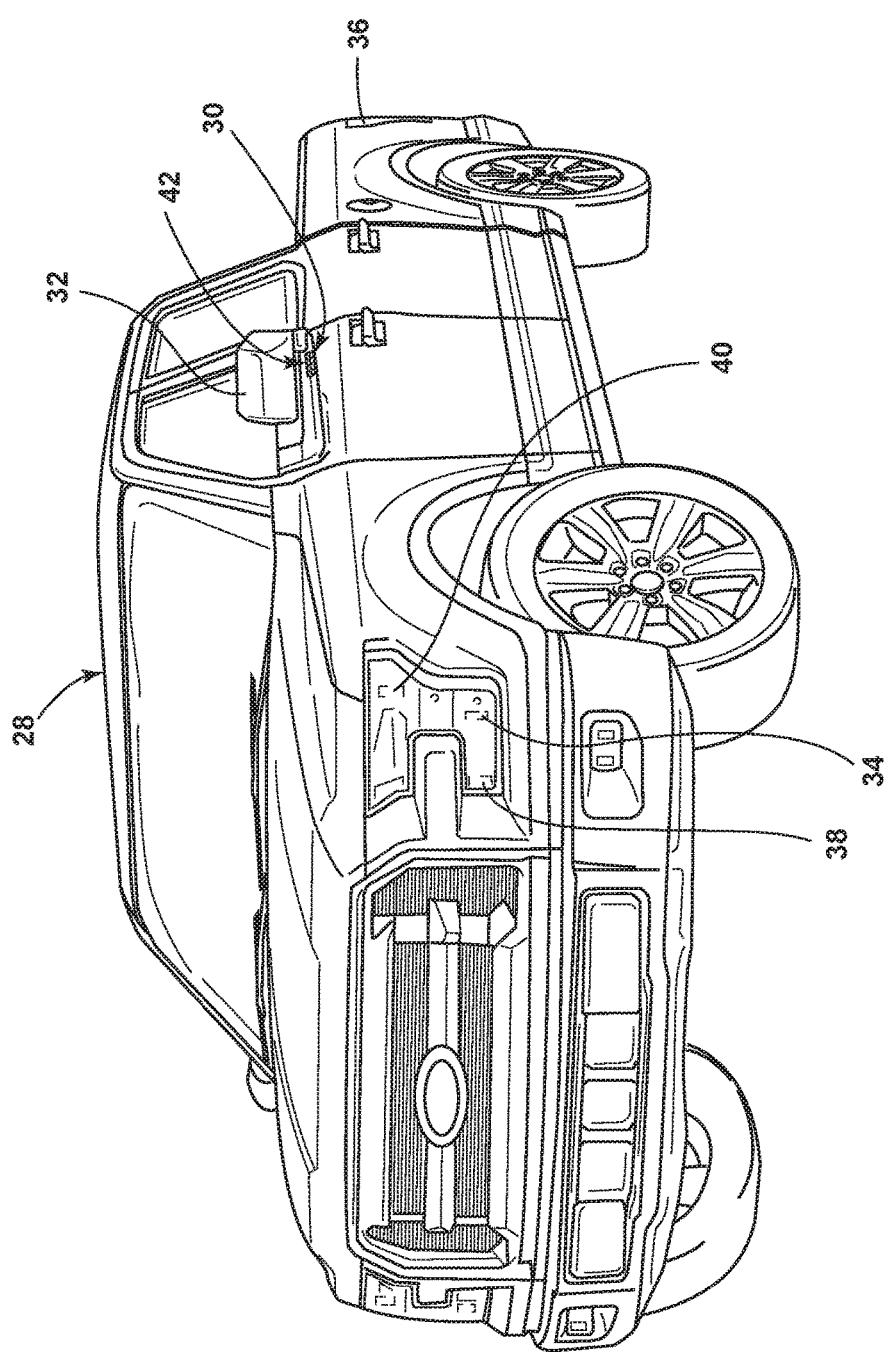
FIG. 2A is a front perspective view of a vehicle containing one or more lamp assemblies, according to at least one example.
Figure 2B:
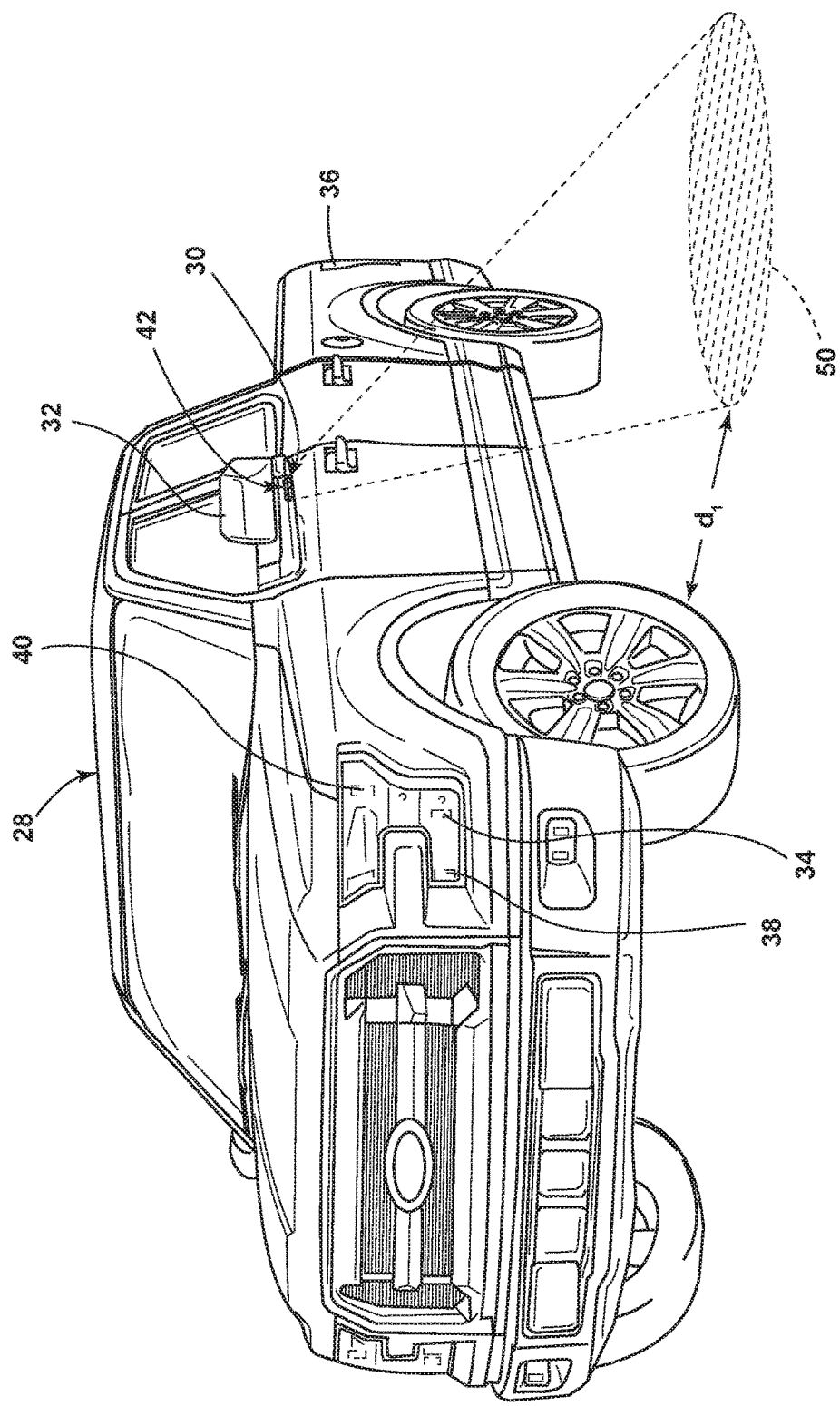
FIG. 2B is a front perspective view of the vehicle having a first illumination pattern emitted from a light assembly, according to at least one example.
Figure 2C:
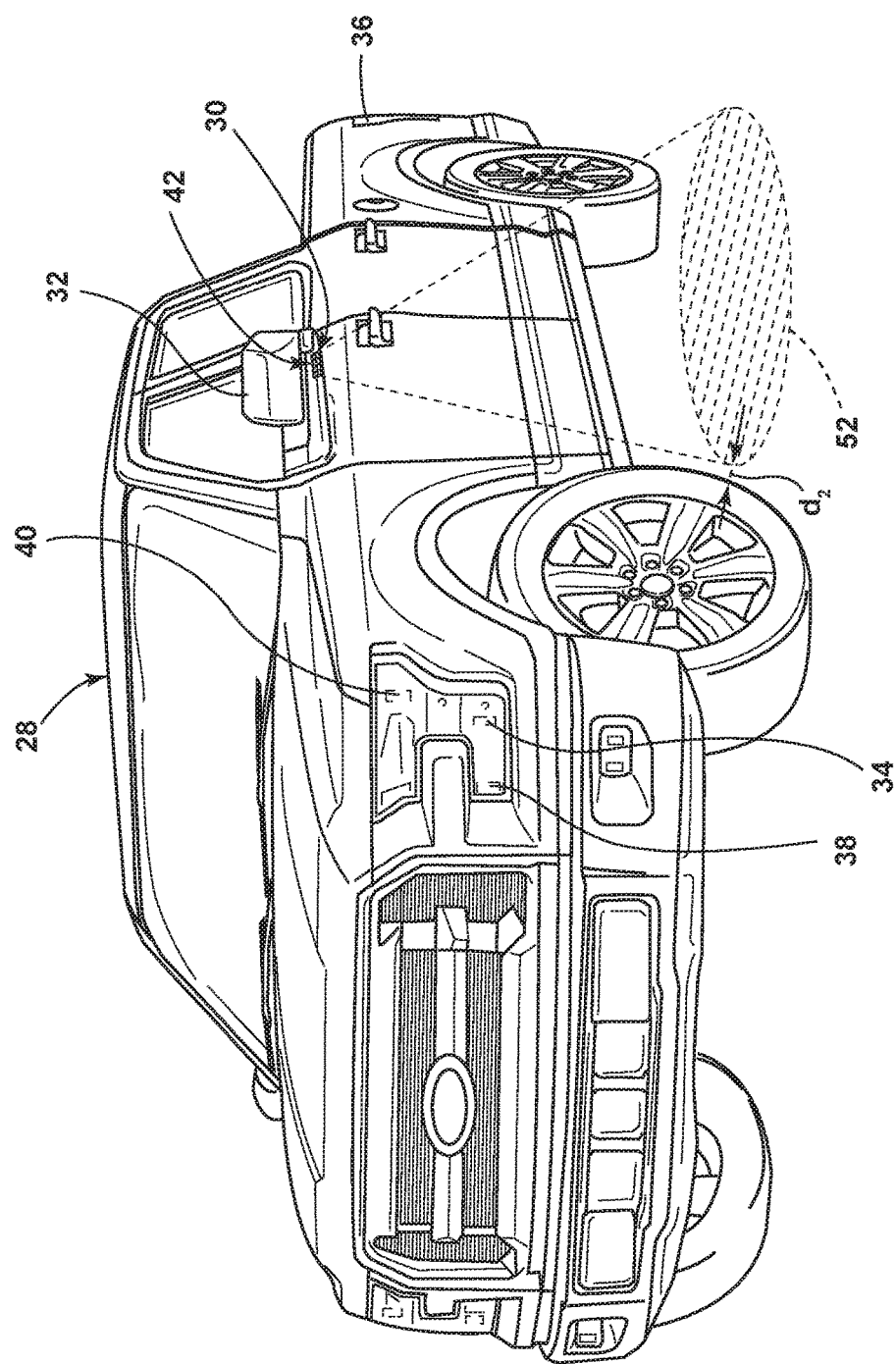
FIG. 2C is a front perspective view of the vehicle having a second illumination pattern emitted from a light assembly, according to at least one example.

Referring now to FIGS. 2A-2C, a vehicle 28 is generally depicted. The vehicle 28 is depicted as a pick-up truck, but it will be understood that the vehicle 28 may be a sports-utility vehicle, sedan, compact and/or other types of vehicles 28 without departing from the teachings provided herein.

The vehicle 28 has a light assembly 30 mounted on and/or integrated with a mirror 32 of the vehicle 28. In the depicted example, the mirror 32 is a side-view mirror 32, but it will be understood that the light assembly 30 may be coupled to a variety of other mirrors 32 positioned around the vehicle 28. Further, the light assembly 30 may be positioned on, or incorporated into, a variety of locations around the vehicle 28. For example, the light assembly 30 may be incorporated into a headlamp 34, a brake lamp 36, a running lamp 38, a turn indicator lamp 40, a backup lamp, any other lamp that may be disposed on the exterior and/or interior of the vehicle 28, and/or combinations thereof. The general shape and appearance light assembly 30 and lamps (e.g., 34, 36, 38, 40) provided therein is by way of example only, as the light assembly 30 may be configured in any practicable shape and include any number of lamps (e.g., 34, 36, 38, 40) herein that perform any function without departing from the scope of the present disclosure. It will be appreciated that the light assembly 30 may be located at other locations on the vehicle 28 and may be disposed on multiple locations (e.g., doors, body panels, trim components, bumpers, etc.) of the vehicle 28 and function in conjunction with one another.

Referring now to FIGS. 2A-3C, the light assembly 30 may include one or more light sources 42 therein. As will be described in greater detail below, each light source 42 includes a focal axis 44 (FIG. 3A) that may be offset from the remaining light sources 42 such that the light assembly 30 may illuminate in a wide range of directions and/or illumination patterns based on the light sources 42 illuminated. Further, each light source 42 may be operated individually to provide a variety of unique, function, and aesthetically pleasing light patterns.

In the depicted example, the light assembly 30 is illustrated having an upper row 46, or upper position, and a lower row 48, or lower position, of light sources 42. As illustrated, each row 46, 48 includes five light sources 42 therein that are laterally arranged with one another. However, it will be appreciated that the light assembly 30 may include any number (one or more) of rows 46, 48 of light sources 42. Furthermore, each row 46, 48 of light sources 42 may include any number (one or more) light sources 42 therein. Moreover, the light sources 42 provided within the light assembly 30 may be oriented in any geometric shape and need not be disposed in rows 46, 48 and/or columns.

The lower row 48 of light sources 42 may have a focal axis 44 that is aimed at a downwardly position or angle from that of the upper row 46 of light sources 42. Accordingly, a first illumination pattern 50 (FIG. 2B) that is emitted from light sources 42 within the upper row 46 of light sources 42 may extend to a distance $d_1$ that is further from the vehicle 28 than an illumination pattern 52 (FIG. 2C) emitted from the lower row 48 of light sources 42 towards a second position that is a second distance $d_2$ from the vehicle 28. The first and second illumination patterns 50, 52 may be used to provide a dynamic puddle lamp and/or spotlight which allows a user of the vehicle 28 to see at varying distances from the vehicle 28. It will be appreciated that any row 46, 48 of light sources 42 may be configured to emit a longer illumination pattern. Accordingly, in various examples, the lower row 48 of light sources 42 may emit a longer illumination pattern while the upper row 46 emits a shorter illumination pattern. Moreover, the upper row 46 and lower row 48 of light sources 42 each include a plurality of light sources 42 that are arranged from an inboard position to an outboard position. The inboardly-disposed light sources 42 may be those that are in closer proximity to a centerline of the vehicle 28. Conversely, the outboardly-disposed light sources 42 may be disposed in closer proximity to a side panel of the vehicle 28. It will be appreciated that the illumination patterns (e.g., 50, 52) described herein may form light cones, which may be described as a surface in space-time, represented as a cone in three dimensions, including the points from which a light signal would reach a given point (at the apex) simultaneously, and that therefore appear simultaneous to an observer at the apex. Moreover, the light cone may be of any geometry without departing from the scope of the present disclosure.

Figure 3A:
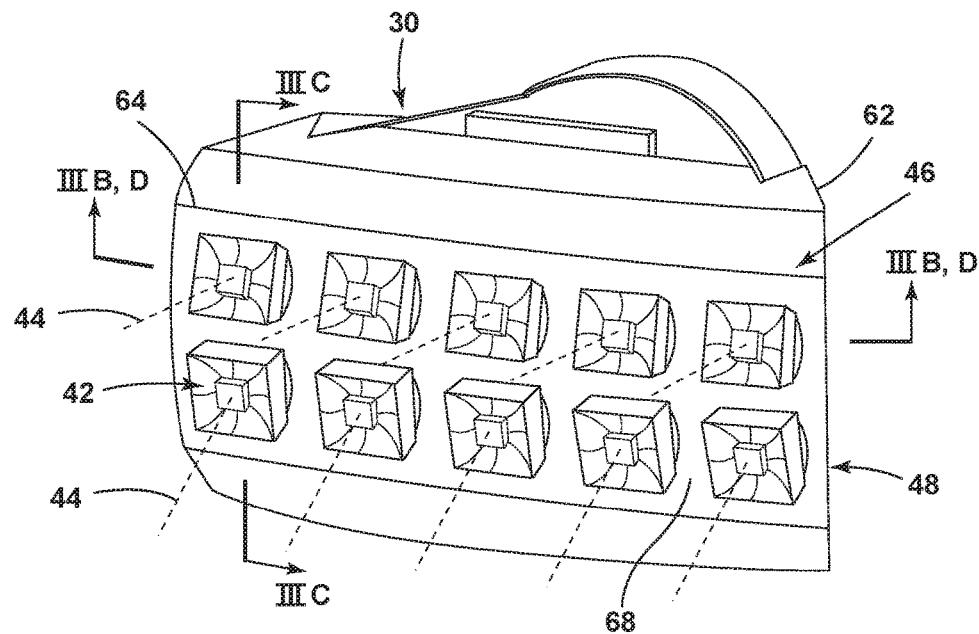
FIG. 3A is a front perspective view of the backup assembly having a plurality of light sources therein, according to at least one example.
Figure 3B:
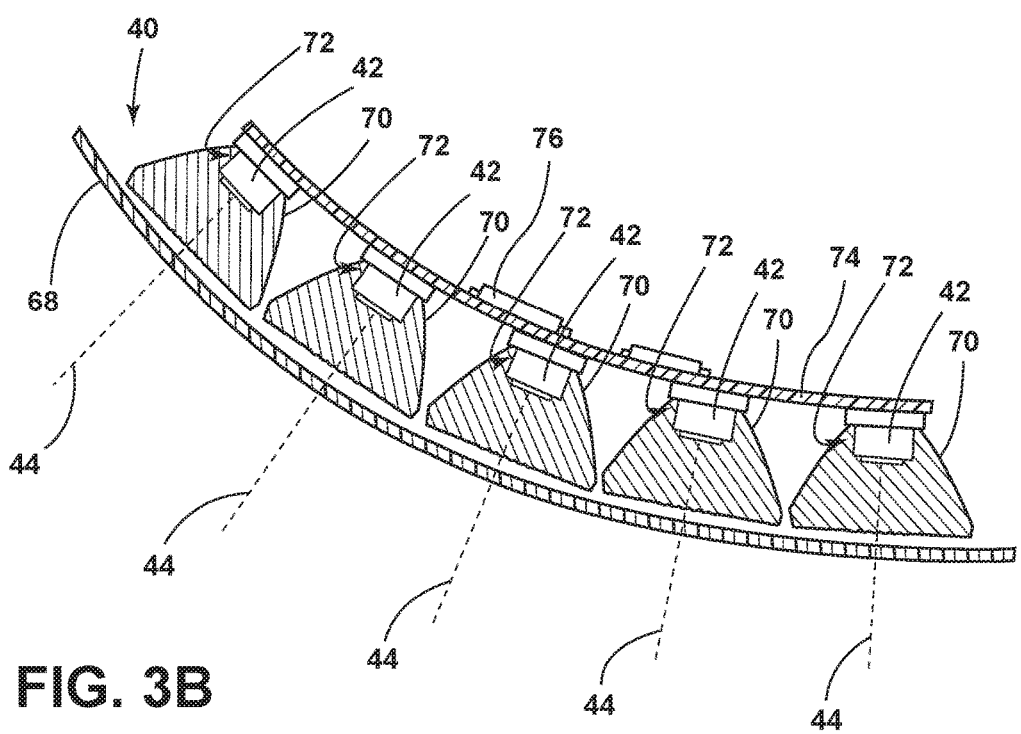
FIG. 3B is a cross-sectional view of the light assembly of FIG. 3A taken along the line according to at least one example.
Figure 3C:
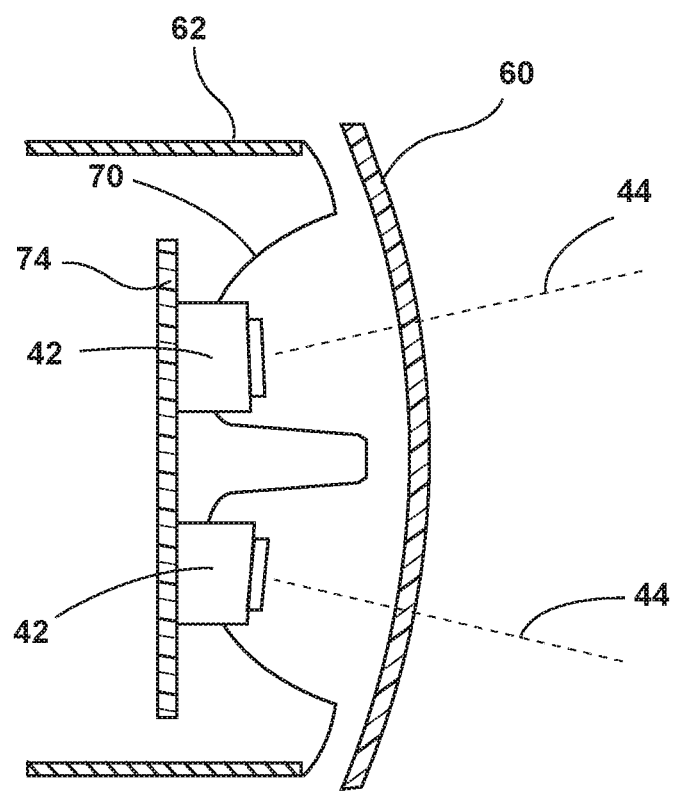
FIG. 3C is a cross-sectional view of the light assembly of FIG. 3A taken along the line IIIC-IIIC, according to at least one example.

Referring to FIGS. 3A-3C, the light assembly 30 includes a housing 62, which may define a rectangular bezel 64 at a front side of the housing 62 through which excitation light output from the one or more light sources 42 may be transmitted through a transparent and/or translucent lens 68 covering the front side of the housing 62. The lens 68 may be fabricated from an optically transparent and/or translucent material, such as polycarbonate, glass, or other translucent materials with high optical quality and capable of being manufactured to tight tolerances. Optics may be arranged within light output windows of the corresponding light sources 42, respectively, such that excitation light 24 output by the light sources 42 is directed towards a desired location. It will be understood, however, that the bezel 64, the lens 68, and/or any other component of the light assembly 30 may be in any geometric shape without departing from the teachings provided herein.

The one or more of the light sources 42 may be configured to emit visible and/or non-visible light, such as blue light, UV light, infrared light, and/or violet light and may include any form of light source 42. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the light assembly 30. Further, various types of LEDs are suitable for use as the light sources 42 including, but not limited to, top-emitting LEDs, side-emitting LEDs, and others. Excitation light generated by the one or more light sources 42 passes generally through the lens 68 of the housing 62 to the outside environment when one or more light sources 42 is illuminated. According to various LED examples, the light sources 42 may have the same luminosity, or intensity, as head lights which may allow for an increased distance at which light from the light sources 42 may reach. Such an example may be advantageous in creating a far reaching spotlight effect from the light sources 42.

The light assembly 30 may further include one or more reflectors 70, such as a parabolic reflector 70, generally operably coupled with each light source 42. The one or more reflectors 70 may be formed from a polymeric material or any other suitable material known in the art. Each light source 42 may be surrounded by an independent reflector 70 that, like the light sources 42, is focally offset from the remaining reflectors 70 such that a wide variety of light patterns may be generated. It should be appreciated that the reflector 70 may be one or more separate components disposed within the housing 62.

The reflectors 70 may be formed integrally, as depicted, and each may include an aperture 72 aligned with the corresponding light source 42. The reflectors 70 are utilized for reflecting and redirecting incidental light rays from the light sources 42 for focusing the illumination in a targeted direction. The reflectors 70 and corresponding light sources 42 are oriented to convey light rearwardly, laterally outboard, and above/below the light assembly 30 for illuminating an expanded illumination pattern and for illuminating an object. The light sources 42 can also be controlled and operated separately for providing clearance illumination forward and rearward of the vehicle 28, which may provide assistance in maneuvering the vehicle 28 in tight confines as explained in greater detail below.

The light assembly 30 may include a printed circuit board (PCB) 74 containing a controller 76 including control circuitry including LED drive circuitry for controlling activation and deactivation of the light sources 42. The PCB 74 may be any type of circuit board including, but not limited to, any flexible PCB and/or rigid PCB. According to various examples, the PCB 74 may have a cross-sectional shape that is substantially similar to that of the lens 68. A temperature sensor may be present on the PCB 74 which may allow for the driving of the light sources 42 at higher than previous currents/light intensity without fear of overheating as thermal roll back may be implemented if the light source 42 overheats. A heat sink may be positioned on the PCB 74 which allows for heat to be dissipated in both puddle lamp and spotlight modes of the light assembly 30. Such a feature may be advantageous in allowing heat sinking of various illumination patterns by a single heat sink.

Figure 3D:
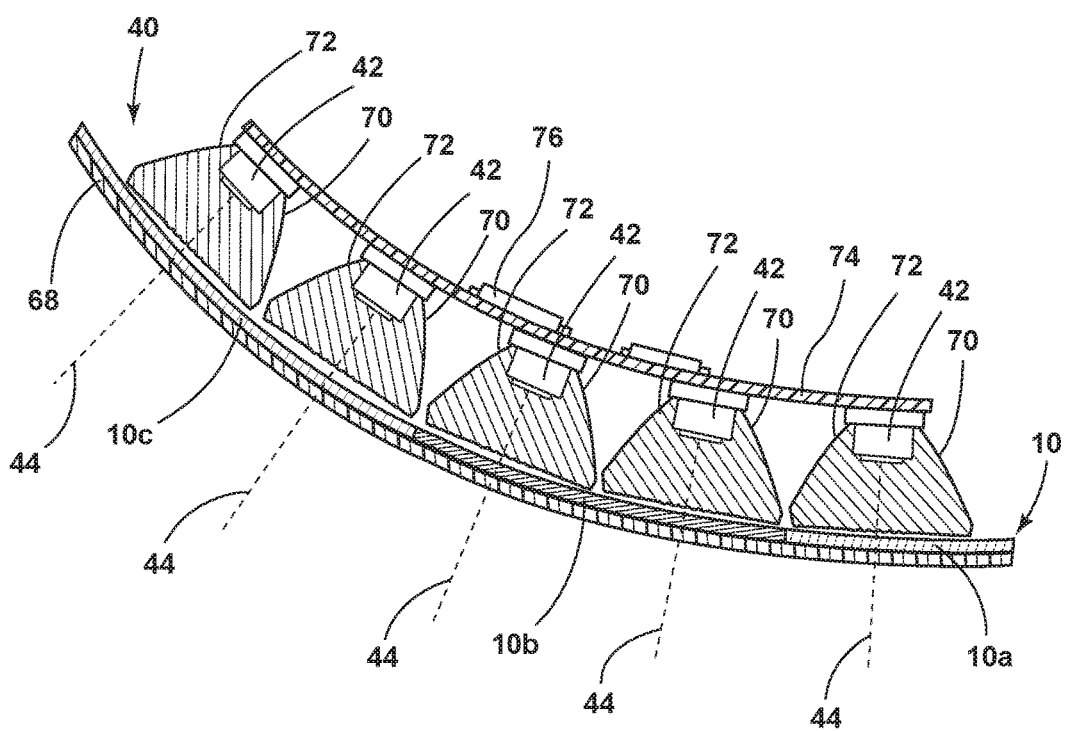
FIG. 3D is a cross-sectional view of the light assembly of FIG. 3A taken along the line IIID-IIID, according to at least one example.

Referring now to FIG. 3D, the luminescent structure 10 may be disposed between the light source 42 and the lens 68. In operation, the luminescent structure 10 may include a plurality of luminescent materials 18 therein that luminesce in response to receiving light of a specific wavelength. According to various examples, the luminescent structure 10 discussed herein is substantially Lambertian; that is, the apparent brightness of the luminescent structure 10 is substantially constant regardless of an observer's angle of view. As described herein, the color of the converted light 26 may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues.

According to various examples, first, second, and third luminescent structures 10a, 10b, 10c may be disposed on various portions of the lens 68. Accordingly, as the corresponding light sources 42 emit excitation light 24 towards the first, second, and third luminescent structures 10 a, 10b, 10c, various wavelengths of converted light 26 are emitted from the light assembly 30 thereby forming a wide array of illumination patterns. The various illumination patterns may allow a driver of the vehicle 28 to see an object within a color pattern of the converted light 26 and utilize this information to determine the lateral distance between the object and the vehicle 28. Additionally, and/or alternatively, the converted light 26 may change from a first wavelength to a second wavelength and/or a first illumination pattern to a second illumination pattern as the vehicle 28 continues to approach a person and/or object to provide additional notification to the person and/or the driver of the vehicle 28.

Figure 4:
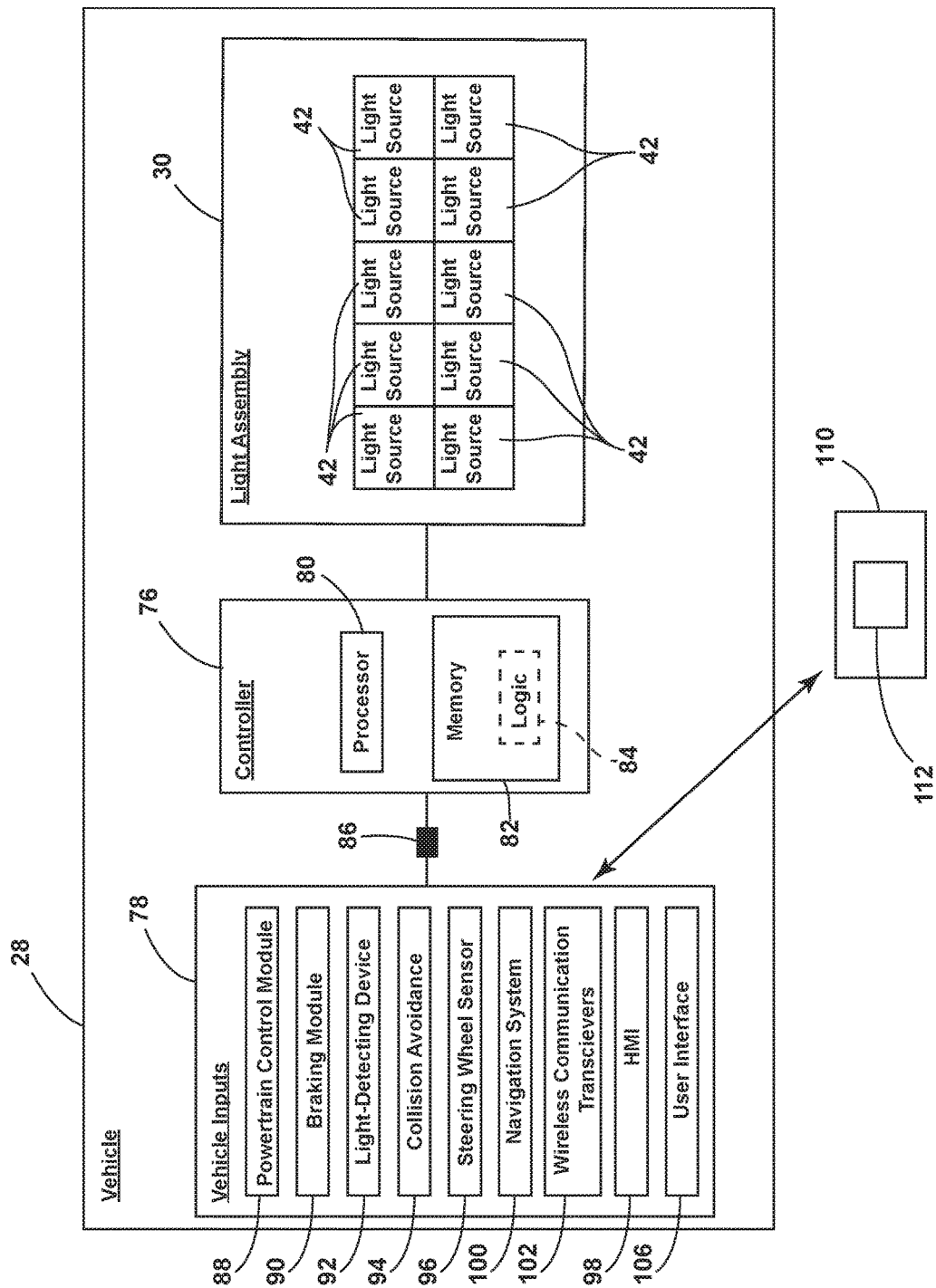
FIG. 4 is a box diagram of the vehicle, according to at least one example.

Referring to FIG. 4, the vehicle 28 is further illustrated having the controller 76 receiving vehicle inputs 78 and controlling each of the light sources 42, by applying signals to the light sources 42. According to various examples, the controller 76 may include a processor 80 and memory 82 as illustrated. It should be appreciated that the controller 76 may include control circuitry such as analog and/or digital control circuitry. Stored within memory 82 and executed by the processor 80 is logic 84 for processing the vehicle inputs 78 and controlling each of the light sources 42.

Figure 5:
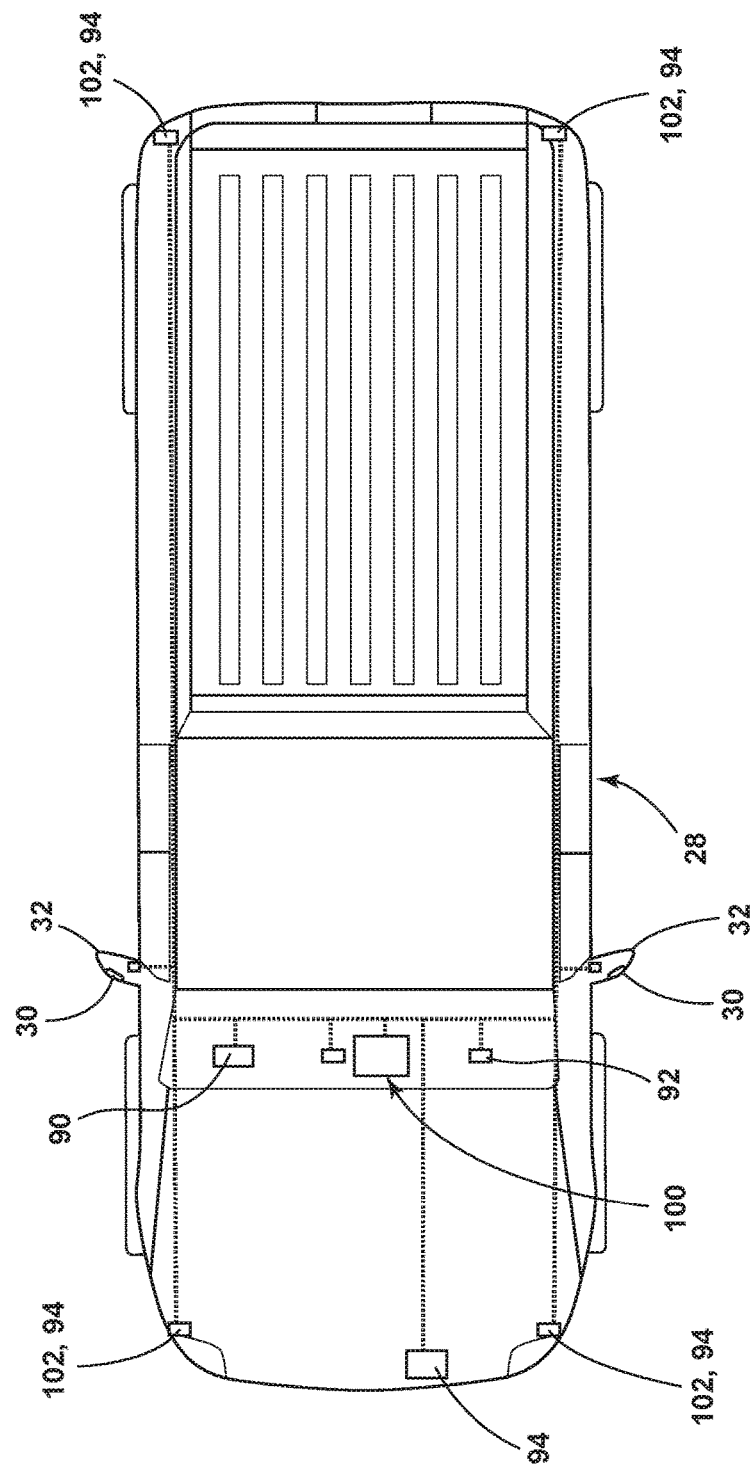
FIG. 5 is a schematic top view of the vehicle of FIG. 2A, according to at least one example.

Referring now to FIGS. 4 and 5, one or more vehicle inputs 78 may communicate with the light assembly 30 through a multiplex communication bus 86. The multiplex communication bus 86 may be disposed within the light assembly 30 and/or the vehicle 28. According to various examples, the vehicle inputs 78 include, but are not limited to, a powertrain control module 88, a braking module 90, a light-detecting device 92, a collision avoidance system 94, a steering wheel position sensor 96, a human-machine interface (HMI) 98, a navigation system 100, and/or one or more wireless communication transceivers 102 disposed on the vehicle 28.

The powertrain control module 88 may be utilized for determining the direction of movement of the vehicle 28 and/or transmission status of the vehicle 28. For example, the powertrain control module 88 may provide the controller 76 with information relating to the ability of the vehicle 28 to move in a forward or rearward direction. In response, the controller 76 may illuminate one or more of the light sources 42 generally in the direction of travel of the vehicle 28.

The braking module 90 may monitor the speed of the vehicle 28. However, it will be appreciated that any other device and/or sensor within the vehicle 28 may additionally and/or alternatively be utilized for determining the speed of the vehicle 28 without departing from the scope of the present disclosure. According to various examples, the controller 76 may increase or decrease the intensity of light emitted from the one or more light sources 42 depending on the speed of the vehicle 28. For example, when the vehicle 28 is traveling below a predefined speed (e.g., three miles per hour (mph)), a first intensity of light may be emitted from one or more of the light sources 42. Conversely, when the vehicle 28 is traveling above the predefined speed, a second, higher intensity of light may be emitted from the one or more light sources 42. The controller 76 may modify the intensity of the emitted first and second wavelengths of excitation light 24 by pulse-width modulation or current control. Further, the intensity of the light sources 42 may be altered via overdriving of the light sources 42. According to various examples, the intensity of light emitted from the light sources 42 may be increased to five times the original intensity.

The light-detecting device 92 may be integrated into the vehicle 28 and/or the light assembly 30. The light-detecting device 92 senses the environmental lighting conditions, such as whether the vehicle 28 is in day-like conditions (i.e., higher light level conditions) and/or whether the vehicle 28 is in night-like conditions (i.e., lower light level conditions). Further, the light-detecting device 92 may detect weather conditions (e.g., rain, snow, sleet, fog, haze, etc.) proximate the vehicle 28 which may indicate low visibility. The light-detecting device 92 can be of any suitable type, and can detect the day-like, night-like and/or weather conditions in any suitable fashion. For instance, in various examples, the light-detecting device 92 includes a light sensor that detects the amount of light (e.g., solar radiation) affecting the vehicle 28 for determining whether day-like or night-like conditions exist. In weather sensing examples, the light-detecting device 92 may further include a moisture sensor or be electrically coupled to a moisture sensor configured to detect moisture proximate the vehicle 28. It will be understood that the moisture sensor may be a standalone sensor positioned elsewhere on the vehicle 28 without departing from the teachings provided herein. According to various examples, a lower initial intensity of excitation light 24 may be emitted by the light source 42 when the light-detecting device 92 senses night-like conditions. A higher initial intensity of excitation light 24 may be emitted when the light-detecting device 92 senses day-like conditions and/or when weather conditions proximate the vehicle 28 indicate low visibility.

The collision avoidance system 94 may be configured to provide data about secondary or other vehicles proximate the vehicle 28 to the controller 76. For example, the collision avoidance system 94 may indicate a secondary vehicle or person approaching the vehicle 28 from a forward direction, a rearward direction and/or from a blind zone position. Any appropriate collision avoidance system 94 may be utilized, such as ultrasonic sensors, sonar systems, light detection and ranging (LIDAR) sensors, RADAR sensors, cameras and/or the like. As will be explained in greater detail below, data from the collision avoidance system 94 may be utilized to determine when and which (e.g., passenger or driver side) light sources 42 may be activated.

The steering wheel position sensor 96 may be any type of sensor known in the art and may monitor the rotational change of a steering wheel of the vehicle 28. According to various examples, as the steering wheel is rotated in one direction, the light sources 42 within the light assembly 30 corresponding to the same side of the vehicle 28 may progressively illuminate from an inboard first portion of light sources 42 to a second portion of light sources 42 outboard of the first portion.

As explained above, the vehicle 28 and/or light assembly 30 may include one or a plurality of wireless communication transceivers 102. The wireless communication transceivers 102 may be configured to interact with an object 110 having a transceiver 112 positioned therein. The wireless communication transceivers 102 may communicate with the transceiver 112 over a wireless signal (e.g., radio frequency). In a specific example, the wireless communication transceivers 102 and/or transceivers 112 may be a Bluetooth™ RN4020 module, or an RN4020 Bluetooth™ low energy PICtail board configured to communicate with the transceiver 112 using Bluetooth™ low energy signals. The wireless communication transceivers 102 may include a transmitter and a receiver to transmit and receive wireless signals (e.g., Bluetooth™ signals) to and from the transceiver 112. It will be appreciated that the wireless communication transceivers 102 may utilize other forms of wireless communication between with the transceiver 112 and other wireless communication transceivers 102 such as Wi-Fi™ without departing from the teachings provided herein. Further, the wireless communication transceivers 102 may also communicate with one or more electronic devices positioned in and/or proximate the vehicle 28. The wireless communication transceivers 102 may be positioned on or within the controller 76 or around the vehicle 28. In various examples, the wireless communication transceivers 102 are standalone devices that are not in communication with body control modules, electronic control modules, engine control modules and/or other features of the vehicle 28.

In examples utilizing multiple wireless communication transceivers 102, the transceivers 102 may be in communication with one another or may mutually communicate with a master controller or module (e.g., body control module). The wireless communication transceivers 102 may be disposed within other accessories of the vehicle 28, or may be standalone units. The transceiver 112 may communicate with all, some, or none of the wireless communication transceivers 102 as the vehicle 28 moves relative to the transceiver 112. Each of the wireless communication transceivers 102 may be aware of its location within the vehicle 28. According to various examples, a location sensing routine may utilize the signal strength and time to return of the signals between the wireless communication transceivers 102 and the transceiver 112 to triangulate the position of the transceiver 112 as the vehicle 28 approaches or moves relative to the object 110. In examples where the wireless communication transceivers 102 communicate with a master module, the location of the transceiver 112 may be calculated in the master module. As such, the location of the object 110 may be determined relative to the vehicle 28. Further, a change in the relative orientation between the object 110 and the vehicle 28 may be determined. The positioned information of the object 110 may then be transmitted to the controller 76 to control the illumination of the light sources 42.

The object 110 may be a variety of natural and/or manufactured structures and/or articles which may be present around the vehicle 28. For example, the object 110 may be a secondary vehicle 114 proximate the vehicle 28 (i.e., in such circumstances, the transceiver 112 may be a wireless communication device within the secondary vehicle 114) or an object 110 fixedly mounted to a ground beneath the vehicle 28. For example, the object 110 may be a sign, a driveway marker, a tree, a brick, a rock or other objects 110 capable of housing the transceiver 112. As will be explained in greater detail below, the object 110 including the transceiver 112 may be utilized to indicate a final destination of the vehicle 28. For example, the transceiver 112 of the object 110 may transmit information to the controller 76 through the wireless communication transceivers 102 indicative of the location of the object 110. In yet other examples, the object 110 may represent a desired end navigation point of the vehicle 28.

In operation, the light sources 42 may be activated using a variety of means. For example, the vehicle 28 may include a user interface 106. In some instances, the user interface 106 may be part of the HMI 98 disposed within the vehicle 28, or the user interface 106 may work in conjunction with the HMI 98. The user interface 106 may be configured such that a user may control the wavelength of excitation light 24 that is emitted by the light source 42 and/or the illumination pattern emitted from the light assembly 30. Additionally, or alternatively, the user interface 106 may be used to switch the light assembly 30 through a plurality of modes and/or functions. The user interface 106 may use any type of control known in the art for controlling the light source 42, such as, but not limited to, switches (e.g., proximity sensors, push-type buttons) and may be disposed in any practicable location. Further, the light assembly 30 may be activated through use of the navigation system 100. For example, the navigation system 100 may transmit data about an intended end location (e.g., that was entered into the navigation system 100) of the vehicle 28 to the controller 76 as well as current positional data about the vehicle 28. In such an example, using the location of the vehicle 28 as well as the intended end location of the vehicle 28, the controller 76 may control the light sources 42 to emit a spotlight 116 or light toward the intended end location of the vehicle 28 (i.e., the location input into the navigation system 100 and/or the object 110 including the transceiver 112). Even further, the light sources 42 may be activated based on the detected presence or location of the transceiver 112 by the wireless communication transceivers 102. In such an example, the light sources 42 may be activated by the controller 76 to emit the spotlight 116 or illumination toward the object 110 which includes the transceiver 112. It will be understood that the light sources 42 may further be controlled to provide the spotlight 116 in a manner that can be controlled with respect to beam width, direction and intensity.

Figure 6:
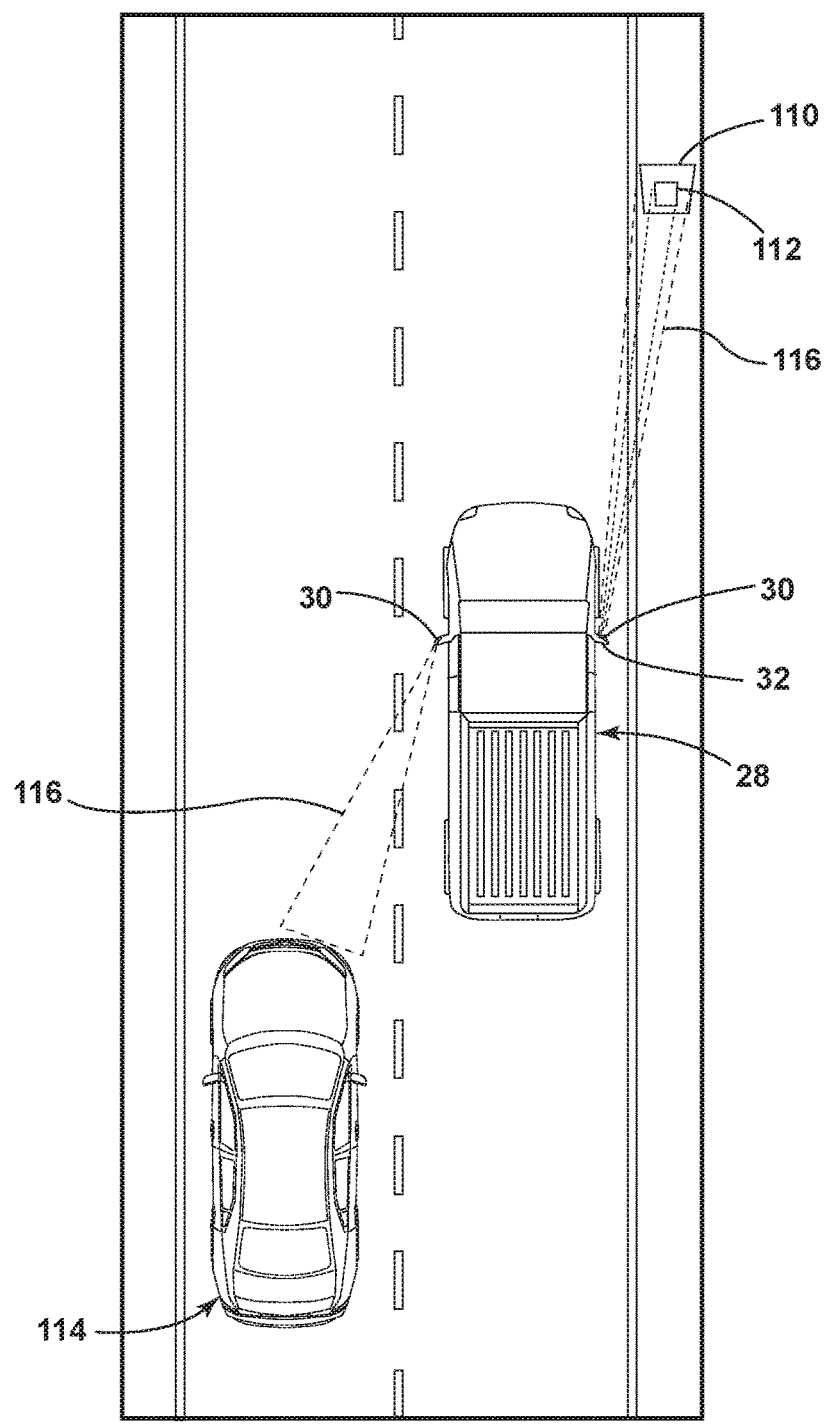
FIG. 6 is a top view of the vehicle of FIG. 2A in operation, according to at least one example.
Figure 7:
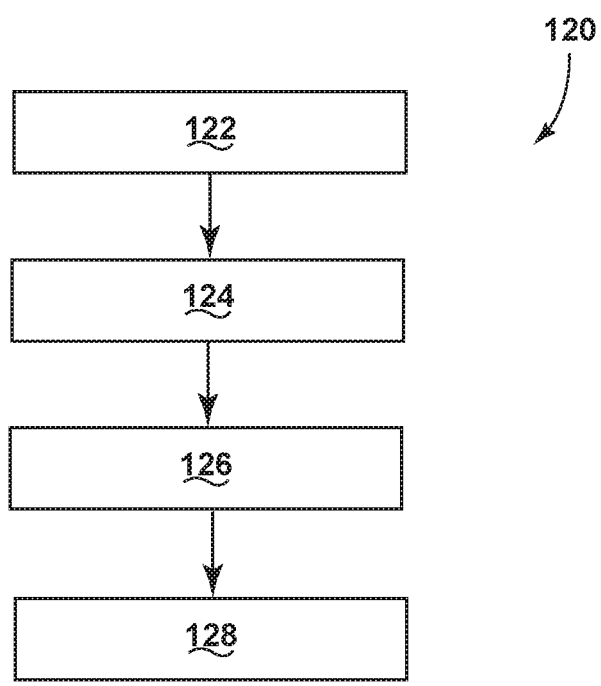
FIG. 7 is a flow diagram illustrating a light control routine for controlling the light assembly, according to at least one example.

Referring now to FIGS. 6 and 7, an exemplary operation of the logic 84 (FIG. 4) is shown. In this depicted example, the disclosure may be advantageous in allowing a driver of the vehicle 28 to visually determine a desired end point of the vehicle 28. As explained above, the logic 84 may be useful in determining the desired end location of the vehicle 28 by using the navigation system (FIG. 4) and/or through use of the wireless communication transceivers 102 and transceiver 112 as explained above. As such, a method 120 of operating the vehicle 28 may include a first step 122 of detecting a location of the object 110 proximate the vehicle 28 via one or more wireless communication transceivers 102. As explained above, the object 110 may include the transceiver 112 which would allow the wireless communication transceivers 102 to determine the location of the object 110.

Next, a step 124 of emitting the spotlight 116 from the side-view mirror 32 to illuminate the object 110 is performed. As explained above, the controller 76 (FIG. 4) may be configured to receive data from the navigation system 100 and/or the wireless communication transceivers 102 and in turn activate one or more of the light sources 42 of the light assembly 30 to emit the spotlight 116 in a particular direction (e.g., toward the object 110 desired end point of the vehicle 28). It will be understood that in instances where the secondary vehicle 114 is positioned between the vehicle 28 and the object 110 (e.g., for instance when the object 110 is on a driver-side of the vehicle 28 and the secondary vehicle 114 is an oncoming car) the spotlight 116 may be disengaged or never engaged to prevent blinding of the driver of the secondary vehicle 114. The spotlight 116 may be activated to illuminate the object 110 once the object 110 is detected (e.g., through the transceiver 112), a predetermined distance to the object 110 is passed, when the vehicle 28 decreases below a threshold speed (e.g., 20 mph as sensed by a brake system), and/or combinations thereof.

Next, a step 126 of detecting a change in the orientation between the vehicle 28 and the object 110 is performed. As the vehicle 28 is moving, the orientation of the vehicle 28 will change relative to the object 110. By utilizing the location data of the vehicle 28 and object 110 (e.g., from the navigation system 100 and/or wireless communication transceivers 102) the controller 76 may determine how much of an angular change has occurred between the object 110 and the vehicle 28. Next, a step 128 of adjusting the spotlight 116 to illuminate the object 110 may be performed. As the controller 76 detects a change in the angle or orientation of the vehicle 28 relative to the object 110, the controller 76 may alter which light sources 42 are activated such that the spotlight 116 changes direction and keeps the object 110 illuminated. In other words, the step of adjusting the spotlight may be performed via selectively illuminating the plurality of light source 42. In addition to altering the direction of the spotlight, the vehicle 28 may provide one or more haptic (e.g., steering wheel vibrations), audible (e.g., chimes) or other indications to the driver that the vehicle 28 is approaching the object 110. It will be understood that although described in a specific order, the method 120 may be performed in any order. Further, the method 120 may omit recited steps or include additional steps without departing from the teachings provided herein.

Figure 8:
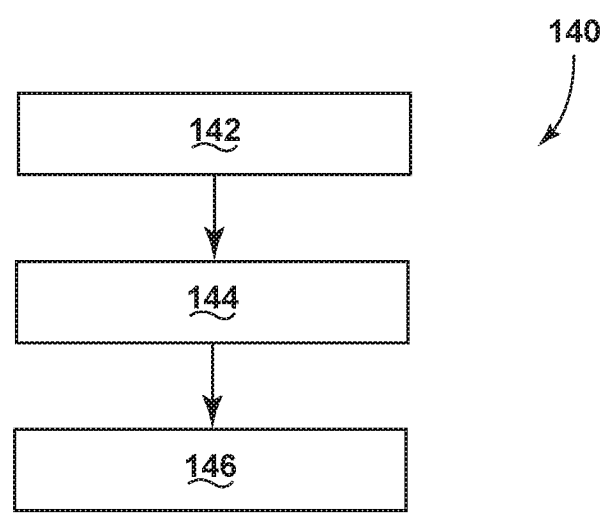
FIG. 8 is a flow diagram illustrating a light control routine for controlling the light assembly, according to at least one example.

Referring now to FIGS. 6 and 8, another exemplary operation of the logic 84 (FIG. 4) is shown. In this depicted example, the light sources 42 may be utilized to notify or alert a driver of the secondary vehicle 114 that the secondary vehicle is 114 is in a blind zone of the vehicle 28. In such a use of the logic 84, a method 140 of operating the vehicle 28 may begin with a step 142 of detecting the secondary vehicle 114 proximate the vehicle 28 via a sensor. The sensor may include any of the sensors listed above in connection with the collision avoidance system 94, or the sensor may use an output from the collision avoidance system 94. The sensor may be configured to detect a distance of the secondary vehicle 114 from the vehicle 28 and/or detect if the secondary vehicle 114 is in a blind zone of the vehicle 28. For purposes of this disclosure, the term "blind zone" may mean areas around the vehicle 28 that cannot be seen by the driver of the vehicle 28 while looking forward and/or through either the rear-view or side-view mirrors 32.

Next, a step 144 of illuminating the light assembly 30 positioned on the side-view mirror 32 of the vehicle 28 may be performed. The light assembly 30 is illuminated by illuminating one or more of the light sources 42. In examples of the light assembly 30 utilizing one or more of the photoluminescent structures 10, the step 142 may further include illuminating a luminescent material (e.g., the photoluminescent structure 10) in a first wavelength of light, the luminescent material configured to emit a second wavelength of converted light.

Next, a step 146 of emitting the spotlight 116 from the side-view mirror 32 to illuminate the secondary vehicle 114 is performed. The spotlight 116 may have a color and/or intensity sufficient to gain the attention of a driver of the secondary vehicle 114, but not sufficiently high to disorient the driver of the secondary vehicle 114. According to various examples, characteristics of the spotlight 116 may be altered to indicate particular information to the driver of the secondary vehicle 114. For example, the color, intensity, flashing pattern or movement of the spotlight 116 may be altered to indicate distance between the vehicles 28, 114, a predicted collision path, etc.

According to yet other examples, the logic 84 (FIG. 4) may be configured to provide close quarters maneuvering light. Such a feature may be advantageous in parking garages, narrow roads, wooded areas and/or parking lots under low ambient lighting conditions. For example, the light assembly 30 may emit the spotlight 116 automatically when vehicle speed is at or below a predetermined speed (e.g., about 10 mph or less), low ambient lighting is detected and sensors around the vehicle 28 have determined that there are obstacles within a predefined distance (e.g., about 15 ft or less) of the sides or a predetermined distance (e.g., about 40 ft or less) in the front of the vehicle 28. Additionally or alternatively, the vehicle 28 may take into account its location (e.g., from the navigation system 100). For example, if the vehicle 28 determines that it is not on a public road (e.g., in the woods or in a parking garage), the lighting may be activated (e.g., to aid in off road driving). The intensity of the lighting provided by the light assemblies 30 may be reduced for such close quarters maneuvering light.

Use of the present disclosure, the vehicle 28 and/or the light assembly 30 may offer a variety of advantages. First, the light assembly 30 allows for a single assembly which can create both an electronically movable spotlight 116 along with a puddle lamp. Second, as the puddle lamp and the spotlight 116 are both emitted from the same light assembly 30, the heat sinking may also be combined. Third, use of the spotlight 116 from the light assembly 30 allows for the quick and easy determination of a final location based on the navigation system 100 and/or the transceivers 112. Fourth, the low speed maneuvering light increases visibility in confined spaces. As the light assembly 30 is able to quickly adjust both the intensity and direction of the spotlight 116, as well as the number of spotlights 116, the driver may have better visibility of their surroundings. Fifth, the light assembly 30 may signal to drivers of secondary vehicles 114 that they are in the blind zone of the vehicle 28 and may not be seen by the driver of the vehicle 28. Such a feature may be advantageous in reducing the likelihood of a collision between the vehicles 28, 114.

According to various embodiments, a vehicle includes a mirror light assembly. The mirror light assembly includes a plurality of light sources disposed in a housing and a plurality of reflectors surrounding each light source having a focal axis that is offset from each of the remaining reflectors. A sensor is configured to detect an object proximate the vehicle. A controller is configured to selectively illuminate the light sources to illuminate the object. Embodiments of the vehicle can include any one or a combination of the following features:

the plurality of light sources are angularly offset from one another;

the mirror light assembly further comprises a lens, further wherein outboard portions of the lens include a first luminescent material and inboard portions of the lens include a second luminescent material, the first and second luminescent materials configured to emit varied wavelengths of converted light;

the mirror light assembly is further configured to provide a puddle lamp on a ground below the vehicle;

the sensor is a wireless communications transceiver;

the object is fixedly mounted to a ground beneath the vehicle;

the sensor is an ultrasonic sensor; and/or the object is a second vehicle positioned within a blind zone of the vehicle.

According to various embodiments, a method of operating a vehicle includes steps of detecting a location of an object proximate the vehicle via one or more wireless communication transceivers; emitting a spotlight from a side-view mirror to illuminate the object; detecting a change in orientation between the vehicle and the object of interest; and adjusting the spotlight to illuminate the object. Embodiments of the method can include any one or a combination of the following steps and features:

the object is fixedly mounted to a ground beneath the vehicle;

the one or more wireless transceivers comprise a Bluetooth sensor;

the vehicle comprises a plurality of wireless communication transceivers;

the step of adjusting the spotlight further comprises the step of selectively illuminating a plurality of light sources; and/or the step of detecting the location of the object further comprises detecting the location of the object based on data from a navigation system.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A vehicle, comprising:
a mirror light assembly, comprising a plurality of light sources;
a wireless communication sensor configured to detect a transceiver positioned external to the vehicle; and
a controller configured to selectively illuminate the light sources to illuminate the transceiver in response to a detected change in orientation between the vehicle and the transceiver.

2. The vehicle of claim 1, wherein the plurality of light sources are angularly offset from one another.

3. The vehicle of claim 1, wherein the sensor is a Bluetooth transceiver.

4. The vehicle of claim 1, wherein the transceiver is housed in at least one of a driveway marker and a sign.

5. The vehicle of claim 1, wherein the transceiver comprise a Bluetooth transceiver.

6. The vehicle of claim 1, wherein the mirror light assembly further comprises a lens, further wherein outboard portions of the lens include a first luminescent material and inboard portions of the lens include a second luminescent material, the first and second luminescent materials configured to emit varied wavelengths of converted light.

7. The vehicle of claim 6, wherein the luminescent material comprises a photoluminescent material.

8. The vehicle of claim 1, wherein the wireless communication sensor includes a transmitter and a receiver to transmit and receive wireless signals from the transceiver.

9. The vehicle of claim 1, wherein the controller is further configured to:
   process communications from the wireless communication sensor to complete a location sensing routine, wherein the location sensing routine comprises triangulating a location of the transceiver relative to the wireless communication sensor.

* * * * *